United States Patent [19]

Linder et al.

[11] Patent Number: 5,004,011
[45] Date of Patent: Apr. 2, 1991

[54] POSITION INDICATING CONTROL VALVE

[75] Inventors: James C. Linder, Shorewood; Jeffrey J. McKenzie, Watertown, both of Minn.

[73] Assignee: Fluoroware, Inc., Chaska, Minn.

[21] Appl. No.: 565,623

[22] Filed: Aug. 10, 1990

[51] Int. Cl.$^5$ .......................................... F16K 37/00
[52] U.S. Cl. ................................ 137/556; 251/214; 251/267; 251/284; 251/335.2; 251/368
[58] Field of Search ............... 137/553, 556; 251/214, 251/284, 285, 267, 335.2, 368

[56] References Cited

U.S. PATENT DOCUMENTS

| | | | |
|---|---|---|---|
| 1,042,745 | 10/1912 | Zahm | 50/10 |
| 2,031,478 | 2/1936 | Gray | 50/10 |
| 2,091,618 | 8/1937 | Szabo | 137/556 X |
| 2,114,933 | 4/1938 | Nielson | 251/97 |
| 2,382,235 | 8/1945 | Lamar | 251/31 |
| 2,638,307 | 5/1953 | Fortune | 251/31 |
| 2,659,565 | 11/1953 | Johnson et al. | 251/24 |
| 2,675,204 | 4/1954 | Johnson | 251/25 |
| 2,770,799 | 11/1956 | Horn | 340/242 |
| 2,934,090 | 4/1960 | Kenann et al. | 137/625.5 |
| 3,034,761 | 5/1962 | Janquart | 251/210 |
| 3,134,570 | 5/1964 | Jarrett | 137/556 X |
| 3,154,097 | 10/1964 | Welff | 137/556 |
| 3,154,288 | 10/1964 | Tripoli | 251/331 |
| 3,307,574 | 3/1967 | Anderson | 137/312 |
| 3,451,423 | 6/1969 | Priese | 137/556 |
| 3,802,462 | 4/1974 | Trosch | 137/556 |
| 4,010,769 | 3/1977 | De Lorenzo et al. | 137/312 |
| 4,180,239 | 12/1979 | Valukis | 251/60 |
| 4,232,696 | 11/1980 | Burris et al. | 137/62 |
| 4,280,680 | 7/1981 | Payne | 251/175 |
| 4,343,456 | 8/1982 | Zitzloff | 251/255 |
| 4,676,268 | 6/1987 | Sano | 137/556 X |
| 4,720,076 | 1/1988 | Hyde | 251/122 |
| 4,750,709 | 6/1988 | Kolenc et al. | 251/335 |
| 4,819,691 | 4/1989 | Lofgren et al. | 137/556 |
| 4,872,638 | 10/1989 | Thompson et al. | 251/54 |

FOREIGN PATENT DOCUMENTS 941421 11/1963 United Kingdom .

OTHER PUBLICATIONS

"White Bandit", ½" and 1" Teflon Pneumatic Valves Macom Industries, Incorporated, Tustin, Calif., Mar. 1984.

Primary Examiner—John Rivell
Attorney, Agent, or Firm—Palmatier & Sjoquist

[57] ABSTRACT

A position indicating valve for controlling the flow of fluids includes a flow housing with a valve seat and a valve poppet. A control housing is provided adjoining the flow housing with a centrally located, nonrotating valve stem having inward and outward ends. The stem is connected to the valve poppet at its inward end and is threaded at its outward end with an intermediate portion being threaded oppositely. An operating handle is rotatably mounted to the control housing with a configured central aperture therethrough into which the threaded outward end of the stem extends. A configured position indicator and stop is threadably mounted on the outward end of the stem within the aperture and is adapted to actually move inwardly and outwardly of the handle as the handle is rotated. A rotatable coupling is located partially within the control housing and is interlockable with the handle and threadably mounted to and about the stem at the threaded intermediate portion. The coupling is adapted to axially move the stem, the valve poppet and the indictor in the same direction with rotation of the operating handle. The indicator has a greater magnitude of movement than the poppet.

19 Claims, 5 Drawing Sheets

POSITION INDICATING CONTROL VALVE

BACKGROUND OF THE INVENTION

The present invention relates to a position indicating plastic control valve for handling the flow of fluids. More particularly, the plastic valve has a poppet position indicator that moves significantly more than the valve poppet and has axial movement stops which overcome the valve's mechanical advantage and axial force thereby giving the valve high integrity and a long useful life.

Highly corrosive fluids, such as acids, are used in many industries, as in the processing of semi-conductor wafers. The corrosive effects of such fluids or liquids is further increased when their application requires that the liquids be heated to temperatures ranging from 20° to 150° C. which will increase the corrosive effects of the fluids.

The handling and control of heated corrosive fluids in measured amounts has been problematic. Known valves having metallic parts are short lived in that their exposure to corrosive fluids will eventually destroy the valve. Furthermore, many applications absolutely require that metallic particles not be permitted to enter into the stream of the corrosive fluids or liquids which may destroy the usefulness of such fluids.

Construction of valves out of polymers or plastics resistant to heated corrosive fluids is known. Some plastic valves have a handle for rotational adjustment which translates into axial movement of the valve poppet toward the valve seat. Substantial mechanical advantage accompanies this translated force which will eventually wear out and tear down the valve poppet and seat as well as other internal parts with repeated opening and closing of the plastic valve.

Valve position indicators are known which allow the user to known where the valve is positioned, whether it is opened, closed or part way open. Such indicators simply show the poppet motion or only move the actual distance of the poppet. These indicators do not give easy visibility of the position of the valve.

There is a need for a plastic control valve that has a long life and high integrity. Movement stops within the valve should be provided as to limit the substantial mechanical advantage created by handle rotation translated into axial force and movement of the valve poppet upon the valve seat. There is also a need for a valve of whatever material that has a position indicator with movement of a magnitude greater than actual valve poppet movement thereby giving easy visibility of the position of the valve.

SUMMARY OF THE INVENTION

A position indicating valve for controlling the flow of fluids includes a flow housing with a valve seat and a valve poppet. A control housing is provided adjoining the flow housing with a centrally located, nonrotating valve stem having inward and outward ends. The stem is connected to the valve poppet at its inward end and is threaded at its outward end with an intermediate portion being threaded oppositely. An operating handle is rotatably mounted to the control housing with a configured central aperture therethrough into which the threaded outward end of the stem extends. A configured position indicator and stop is threadably mounted on the outward end of the stem within the aperture and is adapted to actually move inwardly and outwardly of the handle as the handle is rotated. A rotatable coupling is located partially within the control housing and is interlockable with the handle and threadably mounted to and about the stem at the threaded intermediate portion. The coupling is adapted to axially move the stem, the valve poppet and the indicator in the same direction with rotation of the operating handle. The indicator has a greater magnitude of movement than the poppet.

A principal object and advantage of the present valve is that the position indicator moves significantly greater than the movement of the valve poppet thereby giving easy visibility of the position of the valve, whether it is open, closed or part way opened.

Another object and advantage of the present invention is that it may be constructed to have no exposed metal parts but is all plastic lending the valve particularly useful for corrosive and hazardous environments into which the valve may be situated.

Another object and advantage of the present invention is that the plastic valve has bearing or stop surfaces to limit the actual movement of the internal parts and to overcome the substantial mechanical advantage when rotating handle adjustments translate into axial movement and force of the stem and valve poppet upon the valve seat.

DETAILED SPECIFICATION

Figure 1:
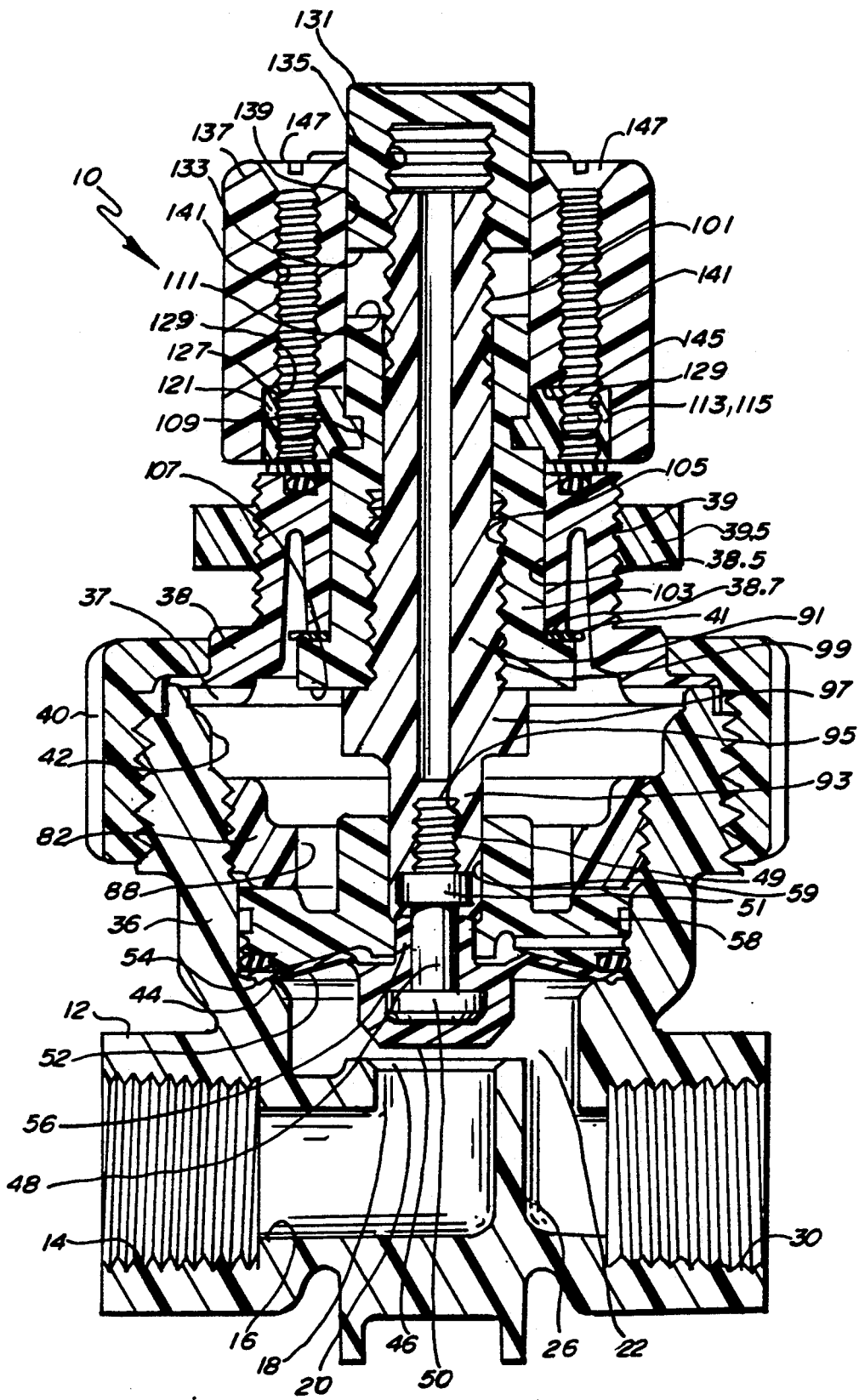
FIG. 1 is a cross sectional elevational view of the present invention in its open position.

Referring to FIGS. 1-8, the position indicating control valve 10 generally includes a flow housing 12 having an inlet 14 and an outlet 30 with a valve chamber 22 therebetween. Above or outward from the flow housing 12 is located a control housing 36. Centrally located in control housing 36 is a valve stem 91 connected to the valve poppet 46. The stem 91 has a threaded intermediate portion or section 99 and an oppositely threaded outward end 101. A coupling 103 is supported and partially within the control housing 36. Coupling 103 is located about and threaded around the intermediate portion 99 of stem 91. The coupling 103 is rotatably interlockable with a rotating operating handle 137 which has a central aperture 139. The threaded outward end 101 of the stem 91 protrudes into aperture 139 upon which is threaded position indicator 131 which moves upwardly or downwardly within aperture 139 as the operating handle 137 is rotated to move the stem 91 and valve poppet 46 upwardly or downwardly.

More specifically, the valve 10 has a flow housing 12 suitably with threaded inlet 14 and inlet passage 16 terminating in upwardly open port 18. At port 18 is located valve seat 20 which opens into valve chamber 22. Thereafter, outlet passage 26 is in flow communication with threaded outlet 30.

Above or connected to flow housing 12 is control housing 36 which has an open top 37 and a housing cap 38. Housing cap 38 has its outer surface 39 threaded so that threaded ring or nut 39.5 may be rotatably turned on to housing cap 38 for ready mounting of valve 10, such as by fitting within an aperture in a wall and locking valve 10 thereat with nut 39.5. Housing cap 38 also has a cap retaining ring 40 which interlocks cap 38 to control housing 36 at open top 37. Housing cap 38 also has a central opening 38.5 and an inner or inward annular bearing surface 38.7 whereat bearing ring 41 is located.

Control housing 36 has an inner wall 42 with an annular shoulder 44. Valve poppet or head 46 is supported by valve operating shaft 48 having a threaded end 49 and head 50 along with a shaft collar 51. Valve poppet 46 is integral with diaphragm 52 which has a circumferential bead or integral O-ring 54 for mounting of the diaphragm 52 and valve poppet 46 onto annular shoulder 44. Alternatively, the bead may be integral with annular shoulder 44. Shaft sleeve 56 extends upwardly from diaphragm 52.

Preferably, the components of flow housing 12, valve poppet 46 and diaphragm 52 are made from TEFLON PFA ® which is registered trademark of E. I. du Pont de Nemours of Wilmington, Del. The composition of TEFLON PFA ® is a perfluoroalkoxy-substituted polytetrafluoroethylene resin. The remaining valve components described herein are suitably made from like or other hard plastics found to be resistant to chemical corrosion and high temperatures.

Diaphragm 52 is held in place by diaphragm retainer 58 which has a configured central aperture 59 (FIG. 8) into which the valve stem 91 passes therethrough, as discussed below. Retainer nut 82 threads into the inner wall 42 to lock diaphragm retainer 58 onto diaphragm 52. Retainer nut 82 also has a central opening 88 through which the operating mechanism (stem 91) of the valve 10 extends.

Figure 8:
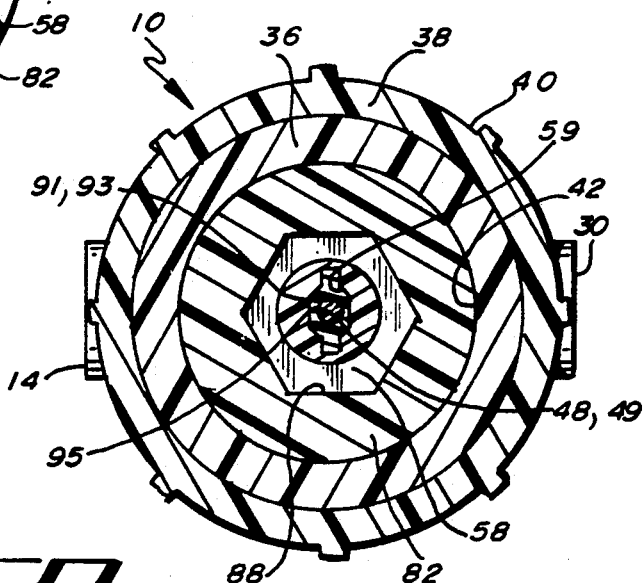
FIG. 8 is a cross sectional view of the present invention taken along lines 8—8 of FIG. 1.
Figure 6:
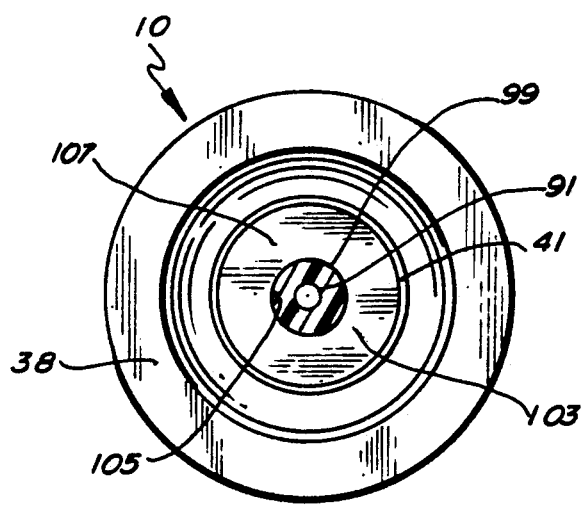
FIG. 6 is a cross sectional view taken along lines 6—6 of the present invention with the housing cap retaining ring removed.

Valve stem 91 is suitably nonrotating and has a configured inward end 93 which passes through and slidably interlocks with configured central aperture 59 of retainer 58 (FIG. 8). At the end of stem end 91 is located a threaded aperture 95 into which the threaded shaft end 49 of valve operating shaft 48 is rotatably interlocked with valve stem 91. Valve stem 91 also has a stem collar or axial movement stop 97 which is inwardly of a threaded intermediate portion or section 99 which appropriately has left hand threads. Stem 91 also has a threaded outward end 101 which has right hand threads.

Illustratively, the threaded intermediate portion 99, which has left hand threads, may have 9/16's of an inch nominal diameter appropriately having 24 threads per inch for a pitch as called out in UNEF-2A specifications. The threaded outward end 101, which is right hand threaded, appropriately has a 7/16's nominal diameter with 20 threads per inch pitch according to UNF-2A specifications.

Coupling 103 is appropriately mounted within the central opening 38.5 of housing cap 38. Coupling 103 has a left hand threaded central aperture 105 through which the intermediate section 99 of stem 91 rotatably is mounted. Coupling 103 also has an inward bearing or stop surface 107 for abutting the stem collar 97 when the coupling 103 is rotated within cap 38 to move stem 91 upwardly until stop or bearing surface 107 and collar 97 contact. Coupling 103 also has an annular groove or channel 109 with a polygonal top or outward bearing surface 111 which is suitably hexagonal in cross section. Coupling retainer 113 within groove 109 appropriately has a right half 115 with a locking slot 117 and key 119 while coupling retainer 113 also has a left half 121 with locking slot 123 and key 125. Coupling retainer 113, by this arrangement, appropriately interlocks coupling 103 partially within housing cap 38 as slot 117 and key 125 as well as slot 123 and key 119 releasably interlock retainer 113 in channel 109 with couling 103 rotatably fixed within cap 38. Coupling 103 appropriately has a raised oval surface 127 with opposing threaded apertures 129.

Stop and position indicator 131 is appropriately configured to be polygonal in cross section and suitably hexagonal. Indicator 131 has an inward bearing or stop surface 133 and an inward threaded aperture 135 which has right hand threads to permit rotatable mounting of the indicator 131 on to the threaded outward end 101 of valve stem 91. Indicator 131 may appropriately be brightly colored for high visibility.

Rotatable operating handle 137 appropriately has a central aperture 139, which is configured to be polygonal in cross section and appropriately hexagonal, so as to slidably and axially receive the indicator 131. Handle 137 also has screw apertures 141 which are alignable with the threaded apertures 129 of coupling retainer 113. Operating handle 137 also has a bottom bearing surface with an oval shaped recess 145 for rotatably interlocking handle 137 onto the raised oval surface 127 of coupling 103. Screws 147 pass through handle apertures 141 into threaded apertures 129 for releasably interlocking handle 137 to coupling 103.

By this arrangement and configuration, the operation of the valve 10 may now be understood and appreciated. With the valve in its fully open position (FIG. 1) handle 137 cannot be rotated counter clockwise because the stem collar 97 is in contact with the inward bearing or stop surface 107 of coupling 103 thereby prohibiting any further upward or outward movement of stem 91. Before turning, indicator 131 is approximately 0.275 inches extending upwardly from the top of handle 137 while valve poppet 46 is approximately 0.125 inches up from the valve seat 20.

Clockwise rotation of handle 137 moves rotatably interlocked coupling 103 in the same direction which acts to move valve stem 91 downward by way of couplings 103's contact with stem 91 about threaded intermediate section 99. Simultaneously, stop or position indicator 131, which actually slides axially within the central aperture opening 139 of operating handle 137, is drawn inwardly by action of the rotating threaded stem end 101 within indicator 131's threaded aperture 135. Handle 137 may be rotated three turns which will bring the inward bearing surface 133 of stop position indicator 131 into contact with the top or outward bearing surface 111 of coupling 103 and prohibit further axial movement of valve stem 91 and valve poppet 146 in the direction of valve seat 20.

The stops or bearing surfaces 133, 111, 107 and 97 are particularly important in the construction of this plastic control valve. The rotational adjustment of valve 10 by way of handle 137 creates axial movement of the valve poppet 46 with substantial mechanical advantage in axial force which may be directed to the valve seat 20 due to the translation of forces and the torque applied. Consequently, the bearing surfaces described are necessary to assure the integrity of valve poppet 46 and valve seat 20 over the useful life of the valve 10. Uniquely, the stop position indicator 131 may be threaded onto the outward end 101 of stem 91 to adjustably control or limit the downward movement and force of valve poppet 46 upon valve seat 20 which may be desirable for various pressure operating conditions that valve 10 may be used for.

The following table relationally explains the movement of the poppet 46 and indicator 131 with respect to each other as handle 137 is rotated to show that the movement of indicator 131 is of a magnitude greater than poppet 46.

Valve Position

Figure 2:
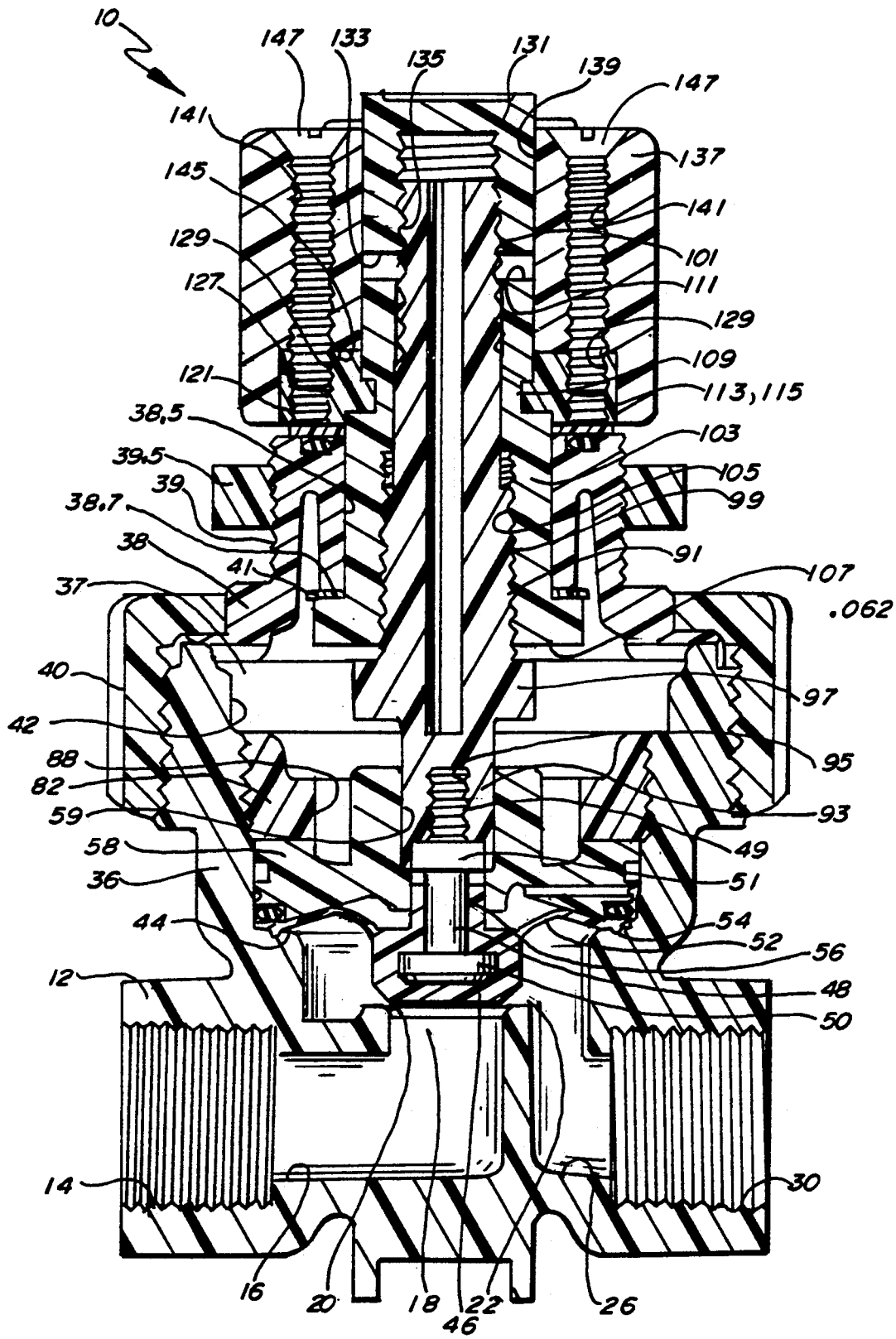
FIG. 2 is a cross sectional elevational view of the present invention partially open.
Figure 3:
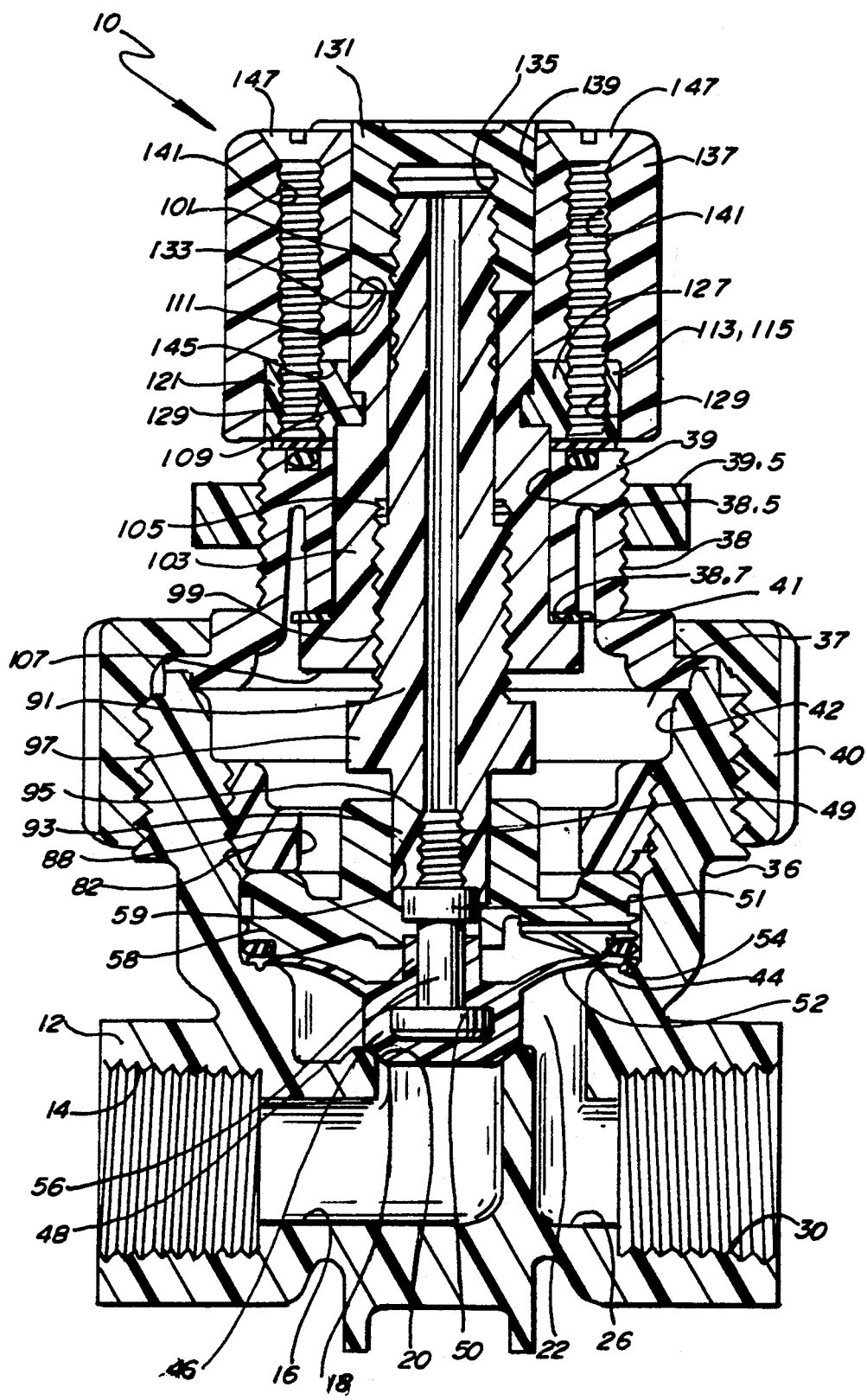
FIG. 3 is a cross sectional view of the present invention in its closed position.
Figure 4:
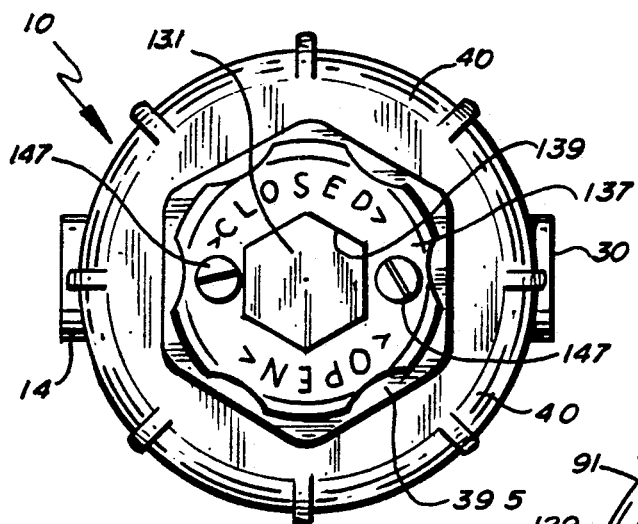
FIG. 4 is a top plan view of the present invention.
Figure 5:
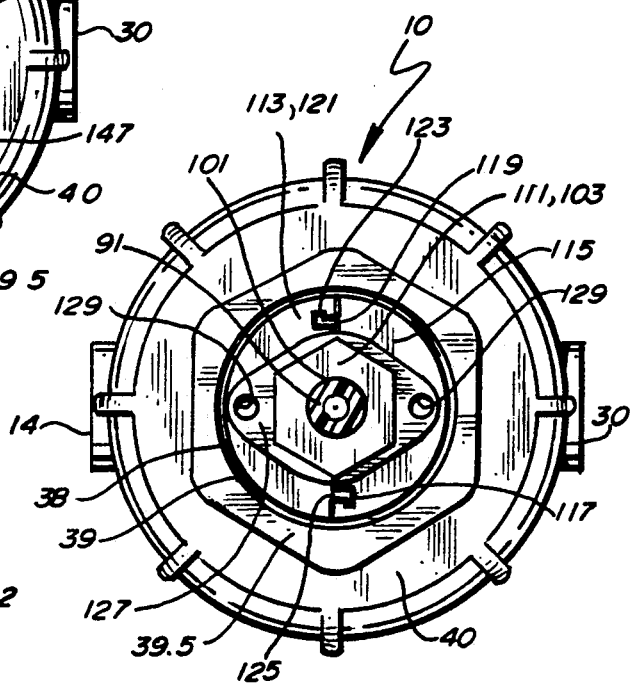
FIG. 5 is a cross sectional view of the present invention taken along lines 5—5 of FIG. 1 with the handle and screws removed.
Figure 7:
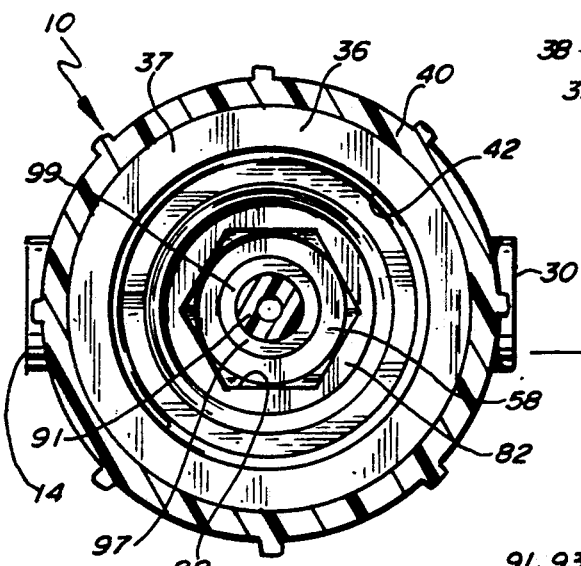
FIG. 7 is a cross sectional view of the invention taken along lines 7—7 of FIG. 1.

|  | FIG. 3 Closed | Middle FIG. 2 1 and 1½ turns CC* | Open FIG. 1 3 turns CC* |
| --- | --- | --- | --- |
| Indicator: | flush with handle in contact with coupler | .137" up from handle | .275" up from handle |
| Poppet: | fully down on seat | .062" up from seat | .125" up from seat |
| Collar: | .125" down from coupler | .062" down from coupler | in Contact with with coupler |

*Counter-Clockwise

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed:

1. A position indicating valve for controlling the flow of fluids which includes a flow housing with a valve seat and a valve poppet, comprising:
   (a) a control housing adjoining the flow housing with a centrally located, nonrotating valve stem having inward and outward ends, the stem being connected to the valve poppet at its inward end and being threaded at its outward end with an intermediate portion being oppositely threaded;
   (b) an operating handle rotatably mounted to the control housing with a configured central aperture therethrough into which the threaded outward end of the stem extends;
   (c) a configured position indicator threadably mounted on the outward end of the stem within the aperture adapted to axially move inwardly and outwardly of the handle as the handle is rotated;
   (d) a rotatable coupling interlockable with the handle and threadably mounted to and about the stem at the intermediate portion adapted to move the stem, the valve poppet and the indicator in the same axial direction with rotation of the operating handle.

2. The position indicating valve of claim 1, wherein the pitch of the threaded intermediate portion is greater than the pitch of the threaded outward end so the handle and the stem axially move the indicator more than the valve poppet.

3. The position indicating valve of claim 1, wherein the indicator has an inward stop surface which adjustably bears upon the coupler to restrict handle rotation and limit force and movement of the stem and valve poppet upon and toward the valve seat.

4. The position indicating valve of claim 1, wherein the stem has a collar inwardly of the threaded intermediate portion which bears upon the coupler to restrict handle rotation and limit the movement of the stem and valve poppet outward from the valve seat.

5. The position indicating valve of claim 1, wherein the cross section of the configured handle aperture and the indicator are polygonal in shape.

6. The position indicating valve of claim 1, further comprising an opening in the control housing and a housing cap therefor, the cap having a central opening for receiving the coupling and being adapted to releasably interlock the coupling to the housing while yet permitting rotation of the coupling with respect to the housing.

7. The position indicating valve of claim 5, wherein the coupling has a polygonal shaped top portion to rotatably interlock with the handle aperture.

8. The position indicating valve of claim 5, wherein the coupling is rotatably interlocked at least partially within the housing.

9. The position indicating valve of claim 1, wherein the stem has a collar inwardly of the threaded intermediate portion, the coupling has an inward stop surface which may bear upon the collar, the indicator has an inward stop surface and the coupling has an outward stop surface which may bear upon the indicator inward stop surface to thereby limit the inward and outward movement of the stem and valve poppet.

10. The position indicating valve of claim 1, wherein the valve is made of plastic.

11. The position indicating valve of claim 1, wherein the position indicator is brightly colored for high visibility.

12. A position indicating plastic valve for controlling the flow of fluids which includes a flow housing with a valve seat and a valve poppet, comprising:
   (a) a control housing adjoining the flow housing with a centrally located nonrotating valve stem having an inward end, a threaded intermediate portion, an outward axial movement stop and an oppositely threaded outward end, the inward end being connected to the valve poppet;
   (b) an operating handle rotatably mounted to the control housing with a configured central aperture therethrough into which the threaded outward end of the stem extends;
   (c) a configured position indicator threadably mounted on the outward end of the stem within the aperture to axially move inwardly and outwardly of the handle as the handle is rotated having an inward stop surface;
   (d) a rotatably coupling at least partially within the housing interlockable with the handle to rotate therewith and threadably mounted to and about the intermediate portion of the stem outward of the axial movement stop of the stem having inward stop surface to abut the stop of the stem and an outward bearing surface to abut the indicator stop surface to adjustably control the axial movement of the valve poppet.

13. The position indicating plastic valve of claim 12, wherein the pitch of the threaded intermediate portion is greater than the pitch of the threaded outward end so the handle and the stem axially move the indicator more than the valve poppet.

14. The position indicating plastic valve of claim 12, wherein the cross section of the configured handle aperture and the indicator are polygonal in shape.

15. The position indicating plastic valve of claim 12, further comprising an opening in the control housing and a housing cap therefor, the cap having a central opening for receiving the coupling and being adapted to releasably interlock the coupling to the housing while yet permitting rotation of the coupling with respect to the housing.

16. The position indicating plastic valve of claim 14, wherein the coupling has a polygonal shaped top portion to rotatably interlock with the handle aperture.

17. The position indicating plastic valve of claim 12, wherein the position indicating plastic valve of claim 10, wherein the coupling is rotatably interlocked at least partially within the housing.

18. The position indicating plastic valve of claim 12, wherein threads of the intermediate portion are left handed and 24 threads per inch while the threads of the outward end are right handed and 20 threads per inch.

19. A position indicating plastic valve for controlling the flow of fluids which includes a flow housing with a valve seat and a valve poppet, comprising:
   (a) a control housing adjoining the flow housing with a centrally located nonrotating valve stem at least partially therein, the stem having an inward end, a left hand threaded intermediate portion, an outward axial movement stop and a right hand threaded outward end, the inward end being connected to the valve poppet, the pitch of the threaded intermediate portion being greater than the pitch of the oppositely threaded outward end;
   (b) an operating handle rotatably mounted to the control housing with a configured central aperture therethrough also polygonal in cross section into which the threaded outward end of the stem extends;
   (c) a position indicator polygonal in cross section threadably mounted on the outward end of the stem within the aperture to axially move inwardly and outwardly of the handle as the handle is rotated having an inward stop surface;
   (d) a rotatably coupling at least partially within the housing interlockable with the handle to rotate therewith and being threadably mounted to and about the intermediate portion of the stem outward of the axial movement stop of the stem having inward stop surface to abut the stop of the stem and an outward bearing surface to abut the indicator stop surface to adjustably control the axial movement of the valve poppet.

* * * * *